H. M. DUDLEY.
DYEING MACHINE.
APPLICATION FILED JAN. 25, 1918.

1,338,217.

Patented Apr. 27, 1920.

Inventor
Howard M. Dudley
By his Attorney

H. M. DUDLEY.
DYEING MACHINE.
APPLICATION FILED JAN. 25, 1918.

1,338,217.

Patented Apr. 27, 1920.
10 SHEETS—SHEET 2.

H. M. DUDLEY.
DYEING MACHINE.
APPLICATION FILED JAN. 25, 1918.
1,338,217.
Patented Apr. 27, 1920.
10 SHEETS—SHEET 3.
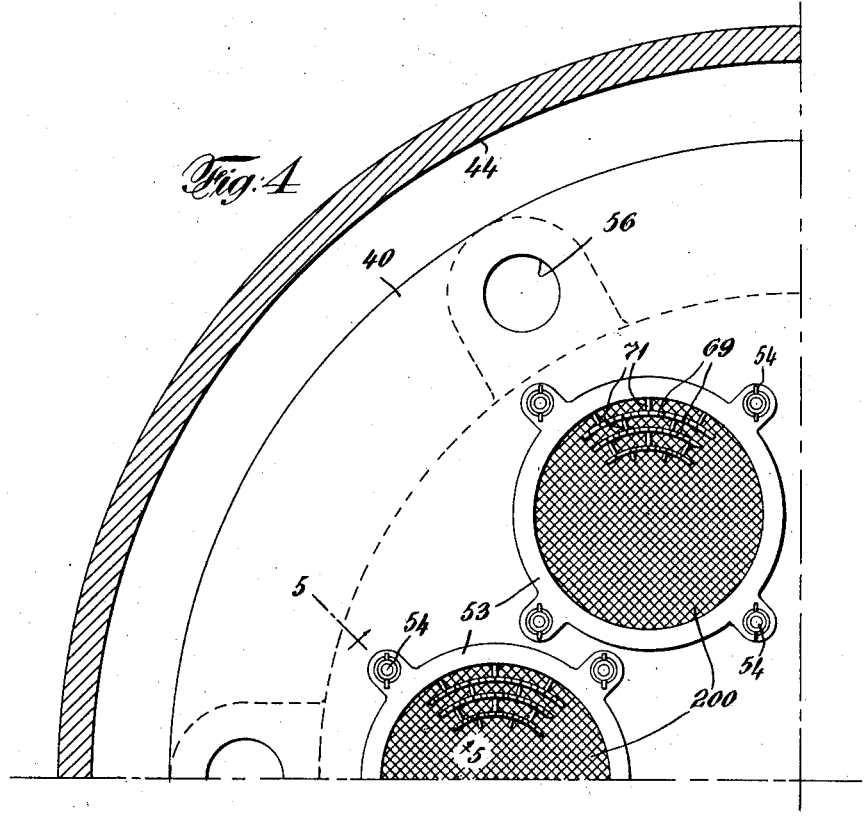
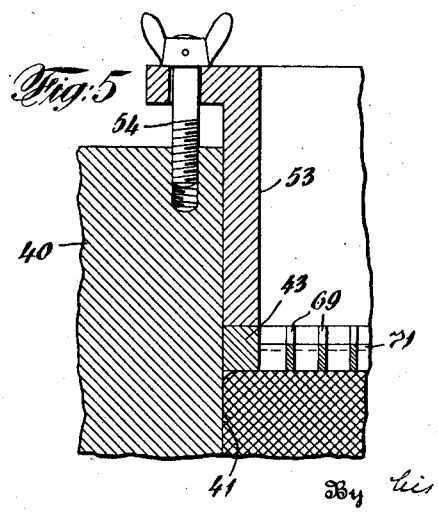
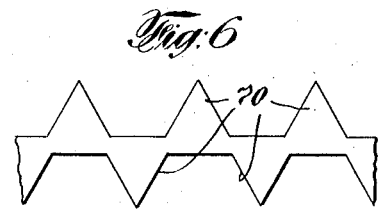

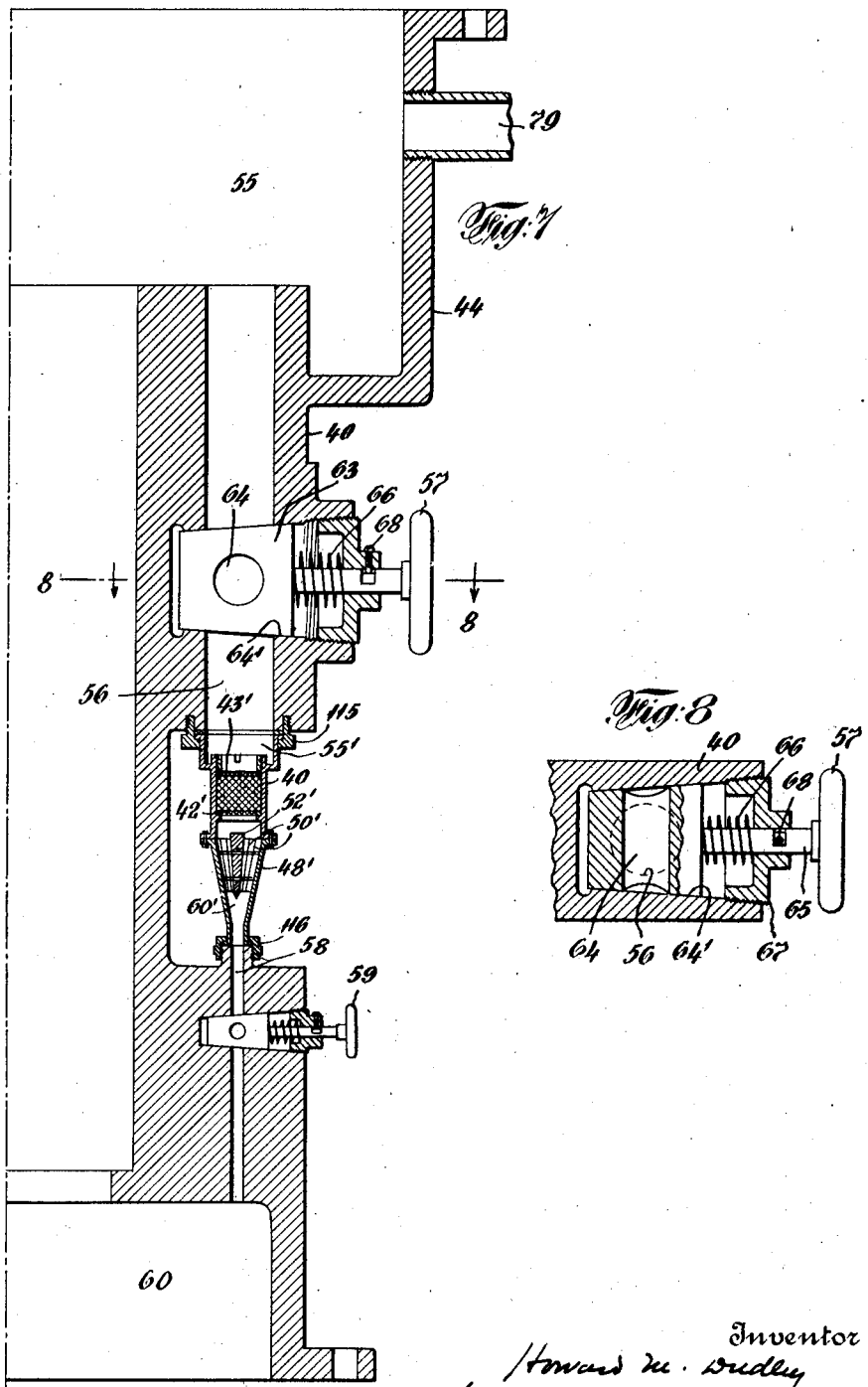

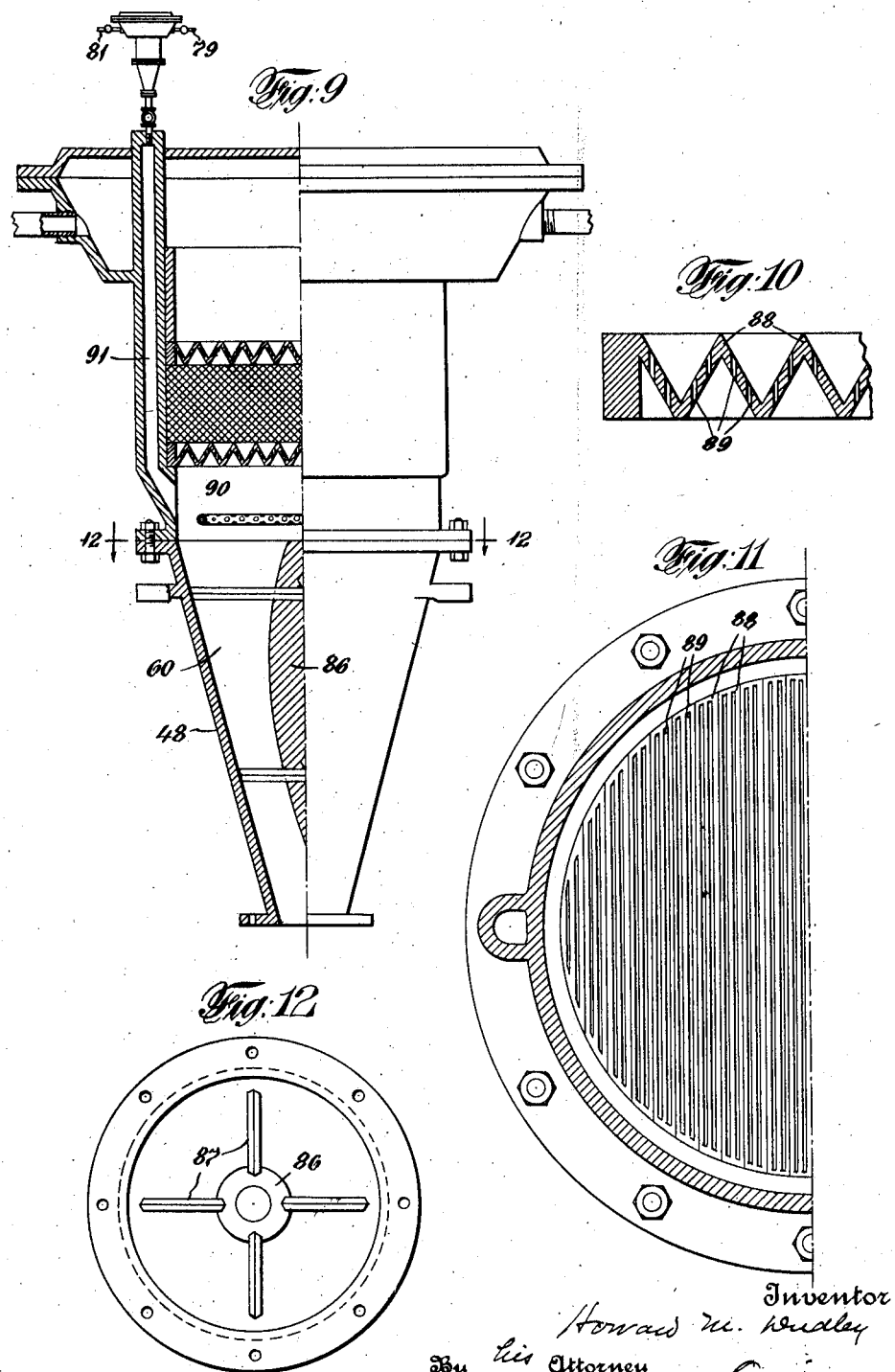

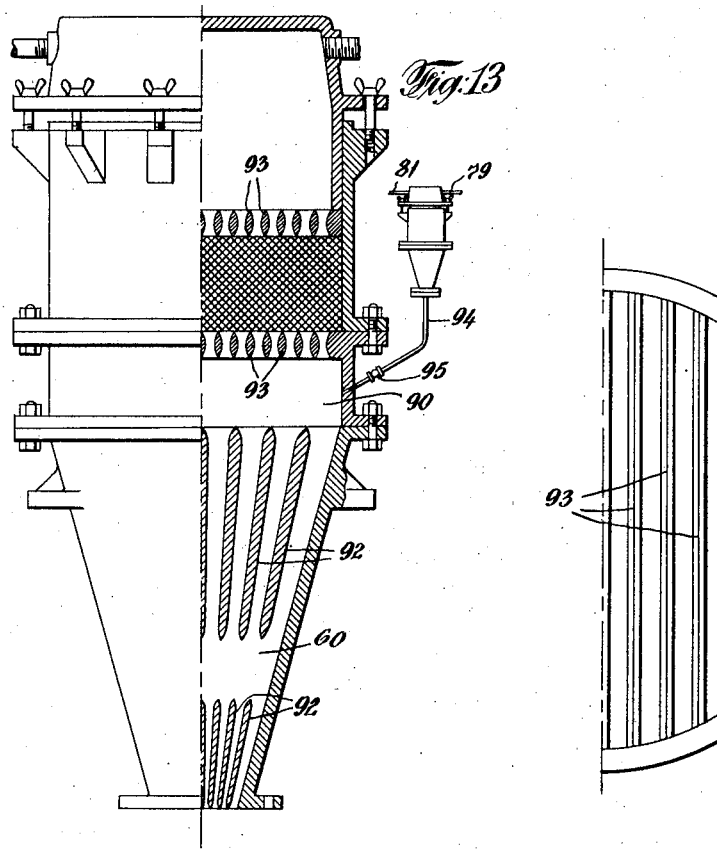
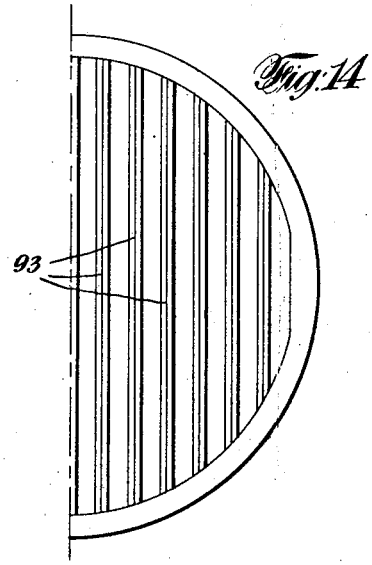
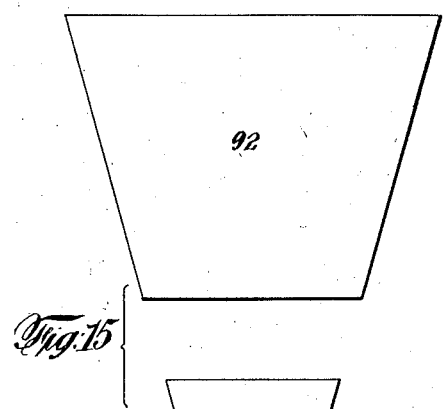

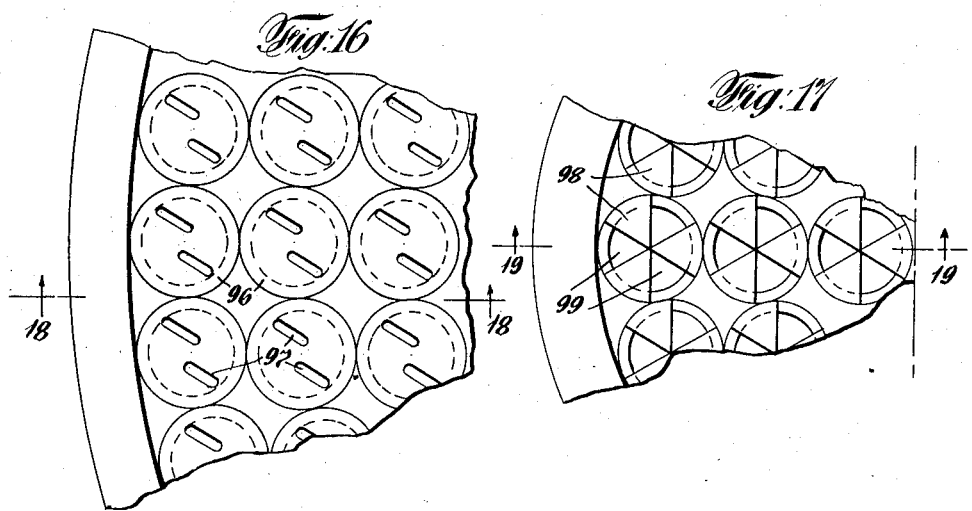
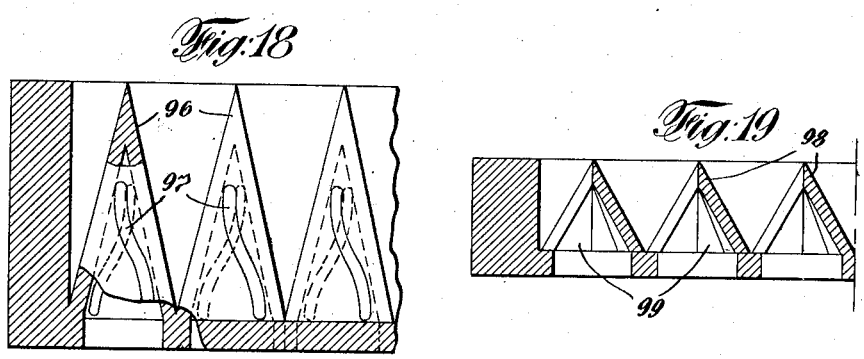
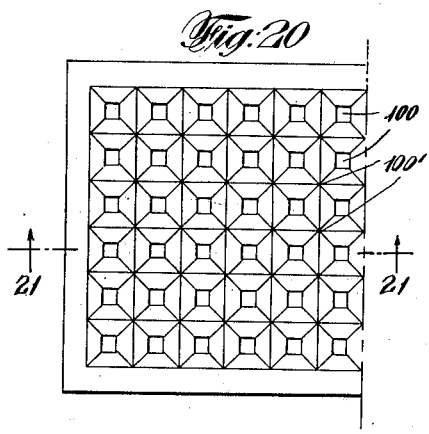
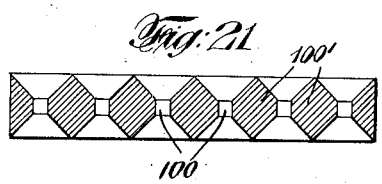

H. M. DUDLEY.
DYEING MACHINE.
APPLICATION FILED JAN. 25, 1918.
1,338,217.
Patented Apr. 27, 1920.
10 SHEETS—SHEET 8.
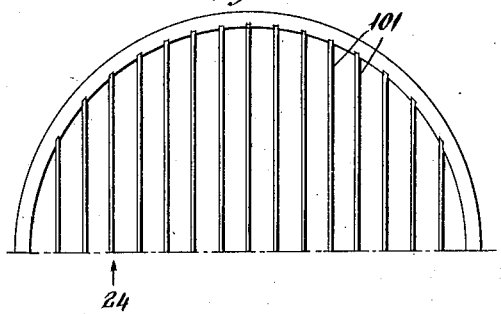
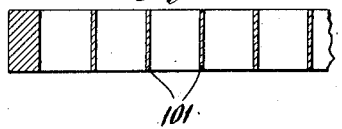
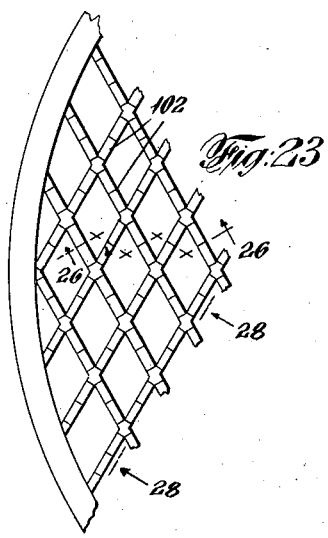
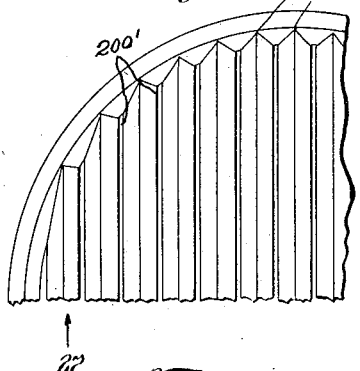
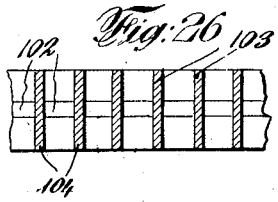
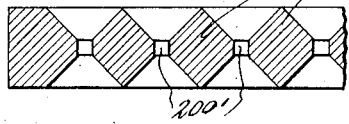
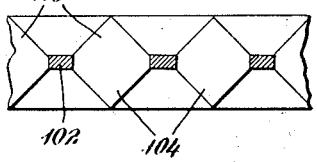
Inventor
Howard M. Dudley
By his Attorney

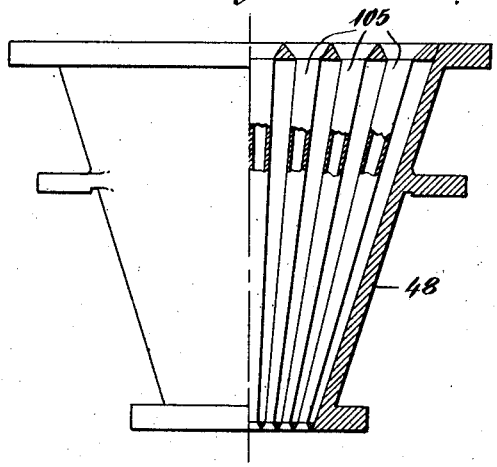
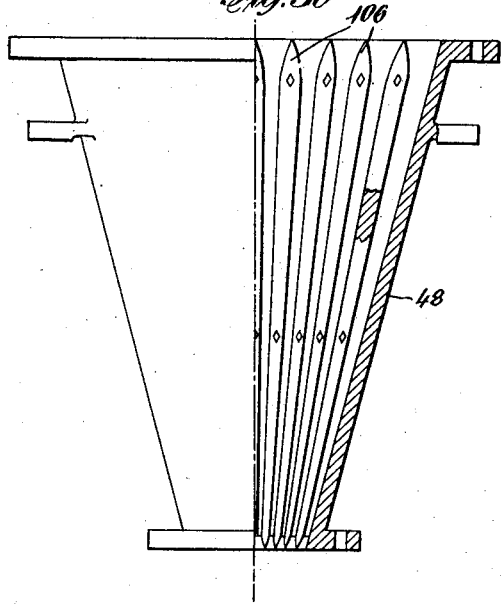
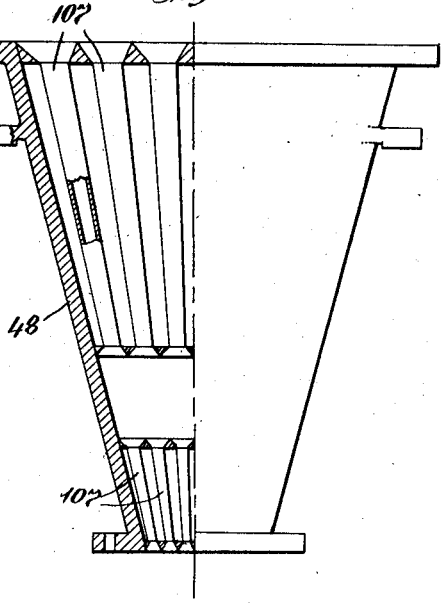

H. M. DUDLEY.
DYEING MACHINE.
APPLICATION FILED JAN. 25, 1918.
1,338,217.
Patented Apr. 27, 1920.
10 SHEETS—SHEET 10.
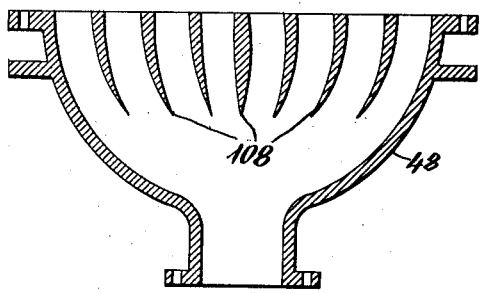
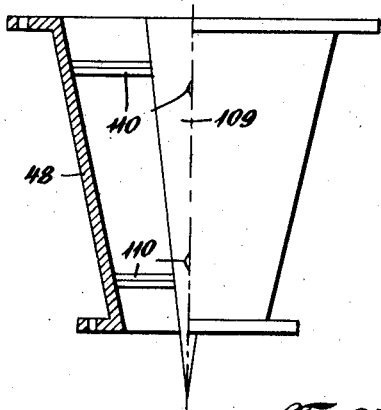
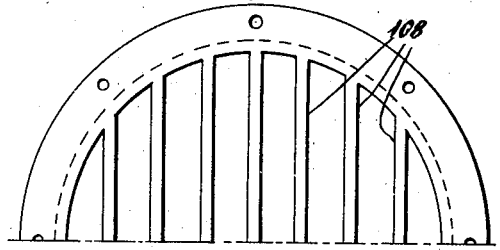
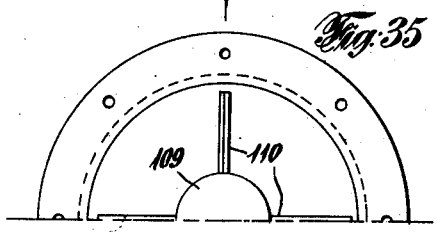
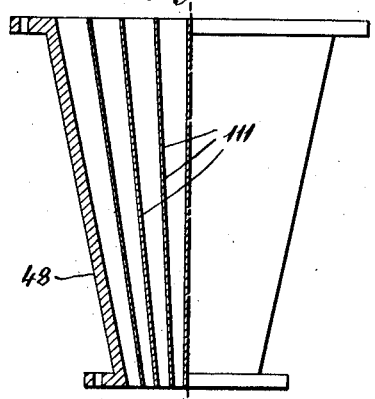
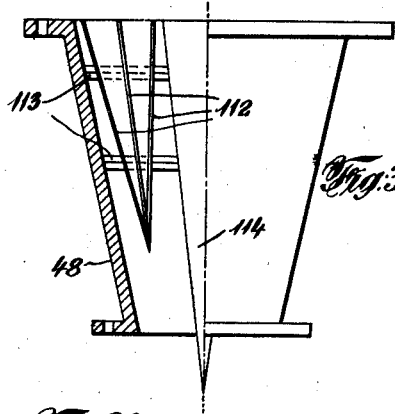
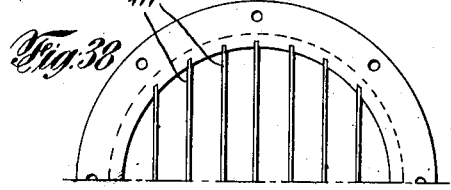
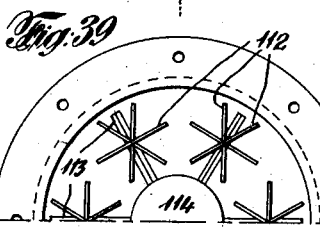
Inventor
Howard M. Dudley
By his Attorney

UNITED STATES PATENT OFFICE.

HOWARD M. DUDLEY, OF PHILADELPHIA, PENNSYLVANIA.

DYEING-MACHINE.

1,338,217. Specification of Letters Patent. Patented Apr. 27, 1920.

Application filed January 25, 1918. Serial No. 213,802.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Dyeing-Machines, of which the following is a full, clear, and exact specification.

My invention relates to dyeing machines and refers particularly to those machines in which textile fibers in the form of warp balls, or similar forms, are dyed, while in a compressed condition.

The dyeing of fibers under these conditions presents many difficulties, as it is essential that all parts of the fiber mass be treated absolutely equally by the dye liquid, as otherwise uneven results will be obtained.

This equal treatment is dependent upon a number of conditions; the fiber must be uniformly and properly compressed, the liquid must be at a uniform pressure throughout the fiber mass, the formation of channels or passages within the fiber mass must be avoided, the dye liquid must be of such dilution as to prevent precipitation upon the fiber, the temperature of the liquid must be properly retained and means must be employed for determining the condition of the dyed fibers without interrupting the dyeing operation, opening the dyeing chamber or disturbing or sampling the fiber being dyed.

It is further advisable that a number of warp balls or similar fiber forms be dyed equally at the same time, in order that the results produced in all of the fiber forms will be uniform and equal.

I have found that valuable commercial results are obtained when the fiber is compressed and then has a dye liquid forced through it in one direction and drawn through it in the reverse direction. The results thus obtained are more uniform than those obtained by forcing the liquid through the fiber in the two directions, as the drawing of the liquid causes a more or less rearrangement of the passages through which the liquid passes, and hence, those portions of the fiber which may not be properly dyed when the liquid passes in one direction, will receive proper treatment when the liquid passes through in the reverse direction.

The process of alternately forcing and drawing a dye liquid through a compressed fiber mass therefore produces more valuable results than can be produced where the liquid is forced through the mass in both directions.

The device of my invention accomplishes all of the above results in a manner economical in construction and cheap, simple, accurate and positive in operation, and possesses, therefore, advantages which will be evident upon a consideration of my specification, drawings and claims.

The device of my invention, in a broad way, comprises a series of fiber chambers within which, fiber masses can be compressed between foraminous plates and a dye liquid forced in one direction therethrough and drawn therethrough in the reverse direction, all parts of the fiber being treated evenly and uniformly.

In order to facilitate the production of these even and uniform results, my device contains a series of inwardly converging members so arranged that the dye liquid passing therethrough is impinged equally and evenly upon all of the lower foraminous plates of the fiber chambers.

It also comprises a means whereby the condition of the fiber may be accurately judged at any time without interrupting the dyeing operation.

In the drawings accompanying my specification, and forming a part thereof, illustrating various modifications of the device of my invention, similar parts are designated by similar numerals.

Fig. 4 is a broken cross-section through the line 4—4 of Fig. 1.

Fig. 5 is a broken cross-section through the line 5—5 of Fig. 4.

Fig. 6 is a broken enlarged development of a member of the foraminous plates.

Fig. 7 is an enlarged vertical cross-section of one of the testing devices.

Fig. 8 is a cross-section through the line 8—8 of Fig. 7.

Fig. 9 is a side plan view of a portion of a modified form of my device.

Fig. 10 is a broken enlarged plan view, partly in section, of the foraminous plates of Fig. 9.

Fig. 11 is a broken top plan view of the foraminous plates of Fig. 9.

Fig. 12 is a cross-section through the line 12—12 of Fig. 9.

Fig. 13 is a broken enlarged plan view, partly in section, of a modified form of my device.

Fig. 14 is a broken top plan view of the foraminous plates of Fig. 13.

Fig. 15 is a side plan view of two of the divergent members of Fig. 13.

Figs. 16, 17, 20, 22, 23 and 25 are broken top plan views of modifications of the foraminous plates.

Fig. 18 is a cross-section through the line 18—18 of Fig. 16, a portion of one of the members being in plan view.

Fig. 19 is a cross-section through the line 19—19 of Fig. 17.

Fig. 21 is a cross-section through the line 21—21 of Fig. 20.

Fig. 24 is a view in the direction of the arrow 24 of Fig. 22.

Fig. 26 is a cross-section through the line 26—26 of Fig. 23.

Fig. 27 is a view in the direction of the arrow 27 of Fig. 25.

Fig. 28 is a cross-section through the line 28—28 of Fig. 23.

Figs. 29, 30, 31, 32, 33, 36 and 37 are side plan views of modifications of the lower conical member, partly in section, to disclose the modified forms of the contained converging members.

Fig. 34 is a broken top plan view of Fig. 32.

Fig. 35 is a broken top plan view of Fig. 33.

Fig. 38 is a broken top plan view of Fig. 36.

Fig. 39 is a broken top plan view of Fig. 37.

Figure 1:
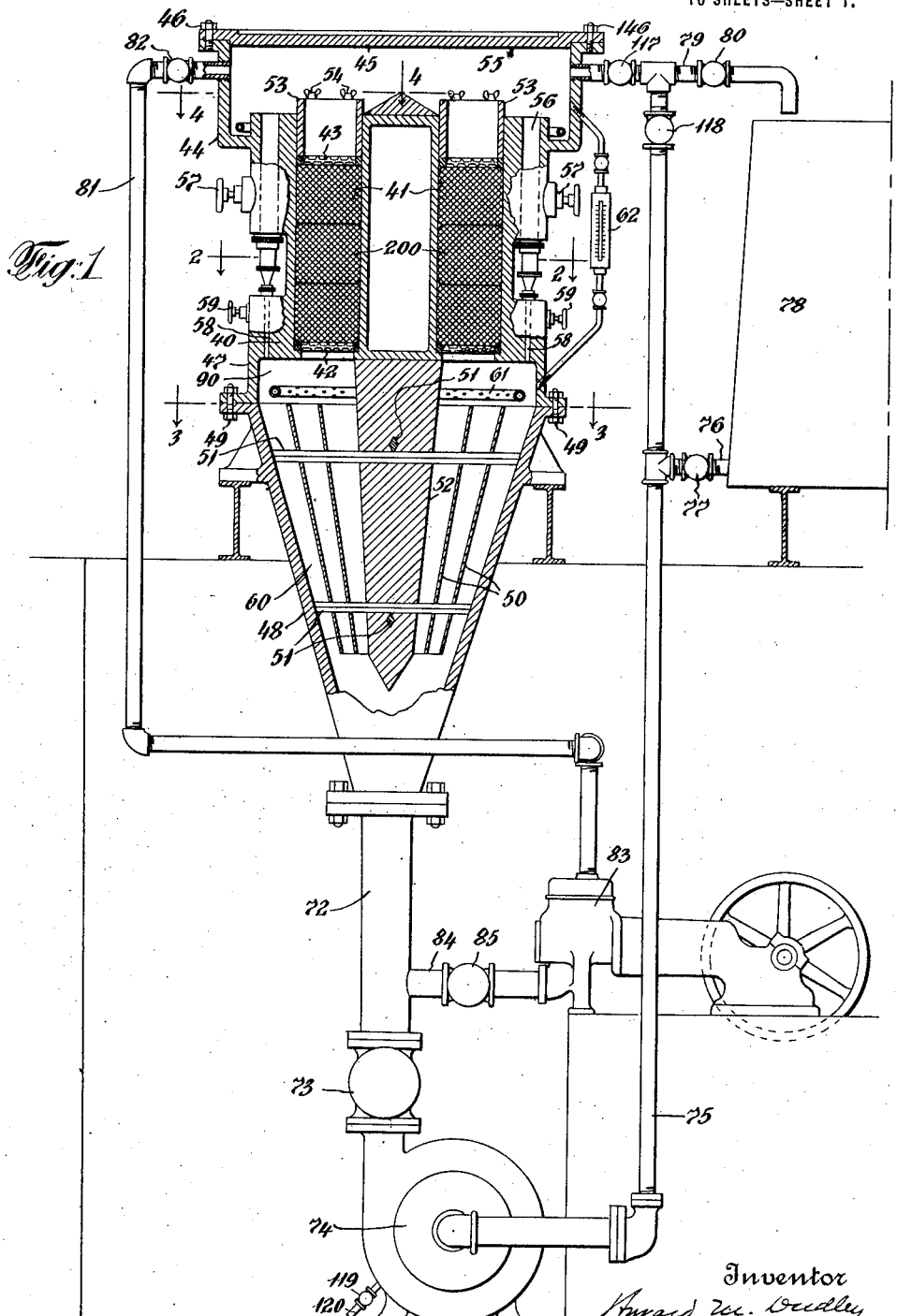
Figure 1 is a side plan view, partly in cross-section, of one form of my device.
Figure 2:
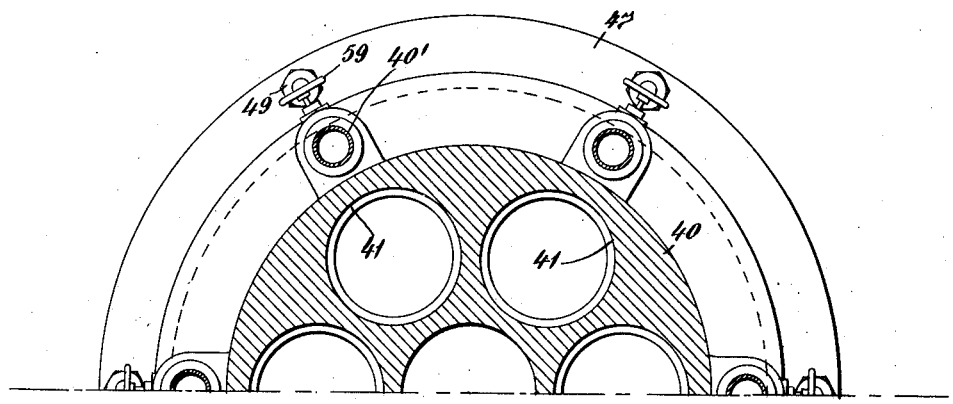
Fig. 2 is a broken cross-section through the line 2—2 of Fig. 1, with the warp balls, upper slidable members and upper foraminous plates removed.
Figure 3:
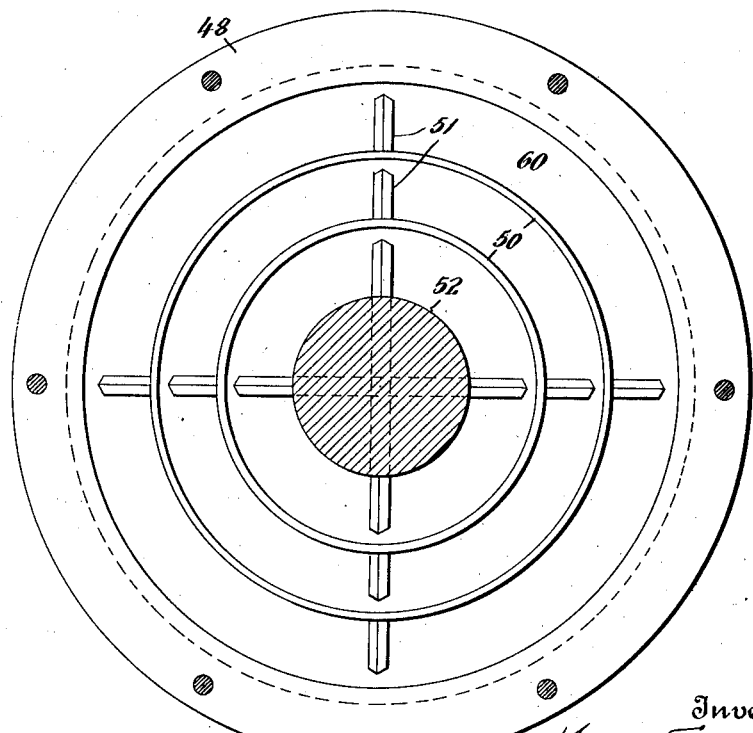
Fig. 3 is a cross-section through the line 3—3 of Fig. 1 with the warp balls removed.

In the form of my device illustrated in Figs. 1 to 8 inclusive, a body member 40 contains a series of fiber chambers 41, 41, each formed by a side wall of the body 40, a lower foraminous plate 42 and an upper foraminous plate 43. The upper portion of the body 40 carries the outwardly and upwardly extended annular member 44, to the upper portion of which the top 45 may be attached by the screw bolts 46, 46. The lower portion of the body 40 carries the outwardly and downwardly extended member 47. A hollow conical member 48 is attached to the member 47 by means of the screw bolts 49, 49. Within the member 48 is a series of upwardly converging conical members 50, 50 supported to the walls of the member 48 by the supporting bars 51, 51, the member 48 also containing the imperforate conical member 52. Slidable within each fiber chamber 41, abutting upon the sides thereof and upon the foraminous plate 43 is an annular member 53, capable of being positioned by the screw bolts 54, 54 threaded in the body 40. Adjacent to each fiber chamber is a smaller testing device, similar and proportionate to the larger device, as shown in Fig. 7, corresponding parts being designated by prime numerals. The reserve chamber 55' of the testing device, corresponding to the chamber 55 of the larger device, is in alinement with the conduit 56 within the body 40, the conduit 56 carrying the valve 57 and opening into the chamber 55. The chamber within the conical member 48' is in alinement with the conduit 58 carrying the valve 59 and opening into the chamber 60 of the member 47. Each testing device is removably attached to the body 40 by means of the couplings 115 and 116. The temperature within the device is governed by the steam pipe 61 and determined by the thermometer 62. The valves 57 and 59 comprise the conical member 63, having the passage 64 revolubly fitted within the seat 64' and attached to the stem 65, the member 63 being maintained in placement by the spring 66 abutting between the member 63 and the coupling 67, 67. The revolution of the valve is governed by the stop pin 68. The foraminous plates 42 and 43 are of the same construction and consist of a series of concentric rings 69, 69, having upwardly and downwardly extended triangular members 70, 70. The rings 69, 69 are maintained in position by the cross-members 71, 71 integral with the rings 69, 69.

The member 48 is attached to the pipe 72 carrying the valve 73 and connected to the discharge chamber of the rotary pump 74. The receiving end of the pump 74 is connected to the pipe 75. The pipe 120, carrying the valve 119 is also connected to the discharge end of the pump 74. The pipe 75, carrying the valve 118, is connected to the pipe 76, carrying the valve 77 and connected to the bottom of the dissolving tank 78. The reserve chamber 55 is connected to the pipes 79, carrying the valves 80 and 117, connected to the pipe 75 and opening into the top of the dissolving tank 78. The reserve chamber 55 is also connected to the pipe 81, carrying the valve 82, the pipe 81 being connected to the discharge end of the reciprocating pump 83. The pipe 72 is connected to the receiving end of the pump 83 by means of the pipe 84 carrying the valve 85.

In the modification shown in Figs. 9, 10, 11 and 12, the chamber 60 contains the central imperforate member 86, supported by the bars 87, 87 and the foraminous plates, consist of a series of parallel angular bars 88, 88, having the openings 89, 89. The testing device is connected to the chamber 90 by the conduit 91, the upper portion of the testing device, or the reserve chamber, being connected directly to the dissolving tank by the pipe 79 and directly the reciprocating pump by the pipe 81.

In the modification shown in Figs. 13, 14 and 15, the chamber 60 contains two series of upwardly converging plates 92, 92, and the foraminous plates consist of a series of parallel bars 93, 93. The testing device is connected to the chamber 90 by the pipe 94 carrying the valve 95, the upper portion of the testing device, or the reserve chamber, being connected directly to the dissolving tank by the pipe 79 and directly to the reciprocating pump by the pipe 81.

The modification of the foraminous plates shown in Figs. 16 and 18, comprises a series of conical members 96, 96 having a series of spiral openings 97, 97.

The modification of the foraminous plates shown in Figs. 17 and 19, comprises a series of parallel cone shaped members 98, 98 with triangular openings 99, 99 extending from the base of each cone to the apex.

The modification of the foraminous plates shown in Figs. 20 and 21, comprises a series of pyramidal shaped openings 100, 100, formed by the grouped parallel spaced upwardly and downwardly extended pyramids 100′ 100′.

The modification of the foraminous plates shown in Figs. 22 and 24, comprises a series of parallel bars 101, 101.

The modification of the foraminous plates shown in Figs. 23, 26 and 28 comprises a series of parallel and intersecting bars 102, 102, carrying upwardly 103, 103 and downwardly 104, 104 extended members.

The modification of the foraminous plate shown in Figs. 25 and 27, comprises a series of parallel cone shaped members 200, 200 having a series of parallel openings 200′ 200′ between them.

The modification of the member 48 shown in Fig. 29 contains a series of upwardly converging tubes 105, 105.

The modification of the member 48, shown in Fig. 30, contains a series of upwardly converging rods 106, 106.

The modification of the member 48, shown in Fig. 31, contains two series of upwardly converging tubes 107, 107.

The modification of the member 48, shown in Figs. 32 and 34, contains a series of parallel downwardly diverging curved members 108, 108, conforming somewhat to the shape of the member 48.

The modification of the member 48, shown in Figs. 33 and 35, contains a downwardly diverging cone shaped member 109 supported by the bars 110, 110.

The modification of the member 48, shown in Figs. 36 and 38, contains a series of upwardly converging plates 111, 111.

The modification of the member 48, shown in Figs. 37 and 39, contains a series of intersecting triangular plates 112, 112, diverging downwardly to a common point of intersection, and supported by the supporting members 113, 113. It also contains the imperforate downwardly extended conical member 114.

The operation of the device is as follows:—

All of the valves are closed with the exception of valves 77, 73 and the series of valves 59, 59 and 57, 57, and the rotary pump 74 started. The dye liquid within the dissolving tank 78 thus passes through the pipe 76, downwardly through the pipe 75 into the pump 74, which forces it through the pipe 72, between the plates 50, 50 of the chamber 60, through the chamber 90 and thence through the series of foraminous plates 42, 42, the fiber masses 200, 200 within the fiber chamber and the series of foraminous plates 43, 43 into the reserve chamber 55. At the same time the liquid passes through the series of conduits 58, 58, the testing devices and thence through the series of conduits 56, 56 into the reserve chamber 55.

When the liquid within the reserve chamber 55 has reached the opening into the pipe 79, valve 117 is opened and valve 77 is closed, the liquid thus passing continuously in the direction above described.

When it is desired to reverse the direction of the liquid, valve 73 is closed, valves 82, 85 and 118 are opened, the pump 74 is stopped and the reciprocating pump 83 is started. The liquid is now drawn from the reserve chamber 55 through the series of plates 43, 43, the fiber within the fiber chambers between the series of plates 50, 50, through the pipes 72 and 84 into the pump 83 and thence forced through the pipe 81 back into the reserve chamber 55, the flow of liquid being continuous.

During both of these operations, the flow of liquid through the testing devices is similar to that through the large device.

From time to time, as desired, the condition of the fiber in the large device may be determined by closing the valves 57, 57, 59, 59, unscrewing the couplings 115, 115, 116, 116, removing the testing device and examining the fiber 200′ therein.

If desired, the liquid may be forced by the pump 74 from the reserve chamber 55, through the pipe 79, the valves 117 and 80 being open and the valve 118 closed, into the dissolving tank 78, or into some other receptacle, or it may be drained off from the device by opening the valve 119 of the pipe 120.

By the above operations, the liquid is alternately forced through the fiber in one direction and drawn through it in the reverse direction.

I do not limit myself to the particular size, shape, number or arrangement of parts as shown and described, all of which may be varied without going beyond the scope of my invention as described and claimed.

What I claim is:—

In a dyeing device, in combination, a body member; a series of fiber chambers within the body; a foraminous bottom within each fiber chamber; a movable foraminous top within each fiber chamber; a slidable member within each fiber chamber abuttable upon the foraminous top; means carried by the body and the slidable member whereby each foraminous top may be variably positioned within the fiber chamber; a liquid chamber above the body; a liquid chamber below the body; downwardly converging members within the lower liquid chamber; means whereby a liquid may be forced upwardly through the lower liquid chamber, the foraminous bottoms, the fiber chambers, the foraminous tops and the upper liquid chamber and means whereby a liquid may be drawn upwardly through the lower liquid chamber, the foraminous bottoms, the fiber chambers, the foraminous tops and the upper liquid chamber.

Signed at New York city, in the county of New York and State of New York, this 24th day of January, 1918.

HOWARD M. DUDLEY.